United States Patent [19]
Mckenney

[11] Patent Number: 6,115,226
[45] Date of Patent: Sep. 5, 2000

[54] APPARATUS FOR LIGHTNING STRIKE SURVIVABILITY AND POST-STRIKE OPERABILITY

[75] Inventor: Bryan M. Mckenney, Austin, Tex.

[73] Assignee: Cisco Technology, Inc., San Jose, Calif.

[21] Appl. No.: 09/206,803

[22] Filed: Dec. 7, 1998

[51] Int. Cl.⁷ ................................................. H02H 3/00
[52] U.S. Cl. ..................... 361/104; 361/93.1; 361/115; 361/106
[58] Field of Search .................. 361/18, 56, 58, 361/103, 104, 105, 106, 115, 93.1, 120, 124

[56] References Cited

U.S. PATENT DOCUMENTS

| | | | |
|---|---|---|---|
| 3,532,827 | 10/1970 | Ewin | 179/18 |
| 3,821,484 | 6/1974 | Sternung et al. | 179/18 EB |
| 4,002,849 | 1/1977 | Kotler et al. | 179/18 EB |
| 4,282,408 | 8/1981 | Stauers | 179/18 FA |
| 4,438,511 | 3/1984 | Baran | 370/19 |
| 4,665,514 | 5/1987 | Ching et al. | 370/60 |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,757,495 | 7/1988 | Decker et al. | 370/76 |
| 4,782,512 | 11/1988 | Hutton | 379/98 |
| 4,833,706 | 5/1989 | Hughes-Hartogs | 379/98 |
| 4,841,561 | 6/1989 | Hill | 379/97 |
| 4,903,295 | 2/1990 | Shannon | 379/437 |
| 4,949,355 | 8/1990 | Dyke et al. | 375/10 |
| 4,980,897 | 12/1990 | Decker et al. | 375/38 |
| 5,025,469 | 6/1991 | Bingham | 379/98 |
| 5,054,034 | 10/1991 | Hughes-Hartogs | 375/8 |
| 5,119,402 | 6/1992 | Ginzburg et al. | 375/17 |
| 5,134,611 | 7/1992 | Steinka et al. | 370/79 |
| 5,185,763 | 2/1993 | Krishnan | 375/39 |
| 5,198,818 | 3/1993 | Samueli et al. | 341/144 |
| 5,199,071 | 3/1993 | Abe et al. | 379/38 |
| 5,202,884 | 4/1993 | Close et al. | 370/94.1 |
| 5,206,886 | 4/1993 | Bingham | 375/97 |
| 5,214,650 | 5/1993 | Renner et al. | 370/110.1 |
| 5,222,077 | 6/1993 | Krishnan | 375/39 |
| 5,228,062 | 7/1993 | Bingham | 375/97 |
| 5,247,347 | 9/1993 | Litteral et al. | 358/85 |

(List continued on next page.)

FOREIGN PATENT DOCUMENTS

| | | | |
|---|---|---|---|
| 62-084646 | 4/1987 | Japan | H04M 3/30 |
| 62-222755 | 9/1987 | Japan | H04M 3/30 |
| 63-76648 | 4/1988 | Japan | H04L 11/02 |
| 02271763 | 11/1990 | Japan | H04L 12/24 |
| 04100367 | 4/1992 | Japan | H04M 3/30 |
| WO 86/02796 | 5/1986 | WIPO . | |
| WO 97/37458 | 10/1997 | WIPO | H04M 3/30 |

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

*Primary Examiner*—Stephen W. Jackson
*Attorney, Agent, or Firm*—Baker Botts L.L.P.

[57] ABSTRACT

A communication system (10) includes a central office (16) that provides communication services to a plurality of subscribers (18) using differential transmission line pairs (21). The differential transmission line pairs are vulnerable to lightning strikes that may damage equipment coupled to the differential transmission line pairs. A protection circuit (51A) protects equipment from damage from a lightning strike and allows for continued operation after the lightning strike. The protection circuit involves automatically resettable fuses (66, 81) in parallel with non-resettable fuses (67, 82). Continued operation is effected at a normal level after a weak lightning strike, and at a reduced level after a strong strike.

24 Claims, 2 Drawing Sheets

U.S. PATENT DOCUMENTS

| | | | |
|---|---|---|---|
| 5,282,155 | 1/1994 | Jones | 364/724.19 |
| 5,285,474 | 2/1994 | Chow et al. | 375/13 |
| 5,293,402 | 3/1994 | Crespo et al. | 375/14 |
| 5,295,159 | 3/1994 | Kerpez | 375/38 |
| 5,331,670 | 7/1994 | Sorbara et al. | 375/111 |
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa et al. | 370/13 |
| 5,367,540 | 11/1994 | Kakuishi et al. | 375/103 |
| 5,371,532 | 12/1994 | Gelman et al. | 348/7 |
| 5,379,441 | 1/1995 | Watanabe et al. | 395/800 |
| 5,390,239 | 2/1995 | Morris et al. | 379/93 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,522 | 4/1995 | Ikehata et al. | 379/98 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,428,608 | 6/1995 | Freeman et al. | 370/60.1 |
| 5,430,793 | 7/1995 | Ueltzen et al. | 379/93 |
| 5,440,335 | 8/1995 | Beveridge | 348/13 |
| 5,442,390 | 8/1995 | Hooper et al. | 348/7 |
| 5,453,779 | 9/1995 | Dan et al. | 348/7 |
| 5,461,415 | 10/1995 | Wolf et al. | 348/7 |
| 5,461,616 | 10/1995 | Suzuki | 370/79 |
| 5,461,640 | 10/1995 | Gatherer | 375/231 |
| 5,469,495 | 11/1995 | Beveridge | 379/56 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,495,483 | 2/1996 | Grube et al. | 370/95.1 |
| 5,504,736 | 4/1996 | Cubbison, Jr. | 370/13 |
| 5,504,753 | 4/1996 | Renger et al. | 371/20.1 |
| 5,506,868 | 4/1996 | Cox et al. | 375/222 |
| 5,513,251 | 4/1996 | Rochkind et al. | 379/93 |
| 5,528,585 | 6/1996 | Cooley et al. | 370/56 |
| 5,546,379 | 8/1996 | Thaweethai et al. | 370/17 |
| 5,555,244 | 9/1996 | Gupta et al. | 370/60.1 |
| 5,574,724 | 11/1996 | Bales et al. | 370/68.1 |
| 5,583,872 | 12/1996 | Albrecht et al. | 370/476 |
| 5,598,406 | 1/1997 | Albrecht et al. | 370/296 |
| 5,600,712 | 2/1997 | Hanson et al. | 379/142 |
| 5,602,902 | 2/1997 | Satterlund et al. | 379/59 |
| 5,631,897 | 5/1997 | Pacheco et al. | 370/237 |
| 5,632,021 | 5/1997 | Jennings et al. | 395/309 |
| 5,649,001 | 7/1997 | Thomas et al. | 379/93.07 |
| 5,668,857 | 9/1997 | McHale | 379/93.07 |
| 5,678,004 | 10/1997 | Thaweethai | 595/187.01 |
| 5,687,176 | 11/1997 | Wisniewski et al. | 370/476 |
| 5,737,364 | 4/1998 | Cohen et al. | 375/220 |
| 5,751,710 | 5/1998 | Crowther et al. | 370/423 |
| 5,756,280 | 5/1998 | Soora et al. | 455/4.2 |
| 5,770,950 | 6/1998 | Zurcher et al. | 326/30 |
| 5,781,617 | 7/1998 | McHale et al. | 379/93.14 |
| 5,793,987 | 8/1998 | Quackenbush et al. | 395/280 |
| 5,799,017 | 8/1998 | Gupta et al. | 370/419 |
| 5,812,786 | 9/1998 | Seazholtz et al. | 395/200.63 |
| 5,831,803 | 11/1998 | Wynn et al. | 361/106 |
| 5,852,655 | 12/1998 | McHale et al. | 379/93.14 |

APPARATUS FOR LIGHTNING STRIKE SURVIVABILITY AND POST-STRIKE OPERABILITY

TECHNICAL FIELD OF THE INVENTION

This invention relates in general to a protection circuit and, more particularly, to a protection circuit for protecting other circuitry from a lightning strike.

BACKGROUND OF THE INVENTION

Modern communication systems are often connected by long differential transmission lines. These transmission lines are vulnerable to lightning strikes. The voltage levels involved with lightning strikes on the long differential transmission lines can easily damage expensive communications equipment coupled to the transmission lines.

Bellcore Spec GR-1089-CORE was developed to address the problem of protecting equipment from lightning strikes. The Bellcore Spec defines two levels of lightning strike. After a level one lightning strike the system must be capable of operating and must not be a safety hazard. After a level two strike the system is not required to continue operating. The level one strike typically involves lower voltage levels than the level two strike.

One method for meeting the Bellcore Spec's requirements is to use at least one non-resettable fuse. The non-resettable fuse is positioned between the equipment to be protected and the transmission lines so that the nonresettable fuse will trip in response to a level two lightning strike on the transmission line before the equipment is damaged. The fuse will not trip in response to the level one strike. After the fuse trips, the fuse must be manually replaced. One such circuit includes two nonresettable fuses which each have one end coupled to a respective line of a differential line pair, and a voltage regulating circuit coupled between the opposite ends of these two fuses.

While this known system has been generally adequate for its intended purpose, it has not been entirely satisfactory in all respects. For example, after a level two strike the non-resettable fuse will have been tripped and the equipment will have been protected, however, the equipment will be non-operable until the fuse is manually replaced. A complete loss of service occurs until the tripped fuse can be manually replaced. The complete loss of telecommunications service to an area may have serious consequences, for example, if a disaster occurs in the affected area. Additionally, customer confidence and satisfaction in the telecommunications service provider is damaged when the provider can not provide phone service for a period of time, even if the period of time is a relatively short period, such as two or three hours. Given the number of systems deployed using the Bellcore standard for lightning strike protection, an enhanced solution that provides continued service after a level two strike, and that can be easily retrofit into existing systems, would be advantageous. Also, because of the number of systems deployed, a cost effective solution requiring minimal parts and cost would also be advantageous.

SUMMARY OF THE INVENTION

From the foregoing, it may be appreciated that a need has arisen for an apparatus for protecting circuits from lightning strikes and for allowing the protection apparatus to continue operating after a strong lightning strike.

According to one form of the present invention, an apparatus is provided to address this need, and involves a communication link which includes a transmission line having first and second ends and a protection circuit coupled to the first end of the transmission line. The protection circuit includes first and second fuses which are coupled in parallel with each other, and which each have one end coupled to the first end of the transmission line. The first fuse is non-resettable and the second fuse is automatically resettable.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
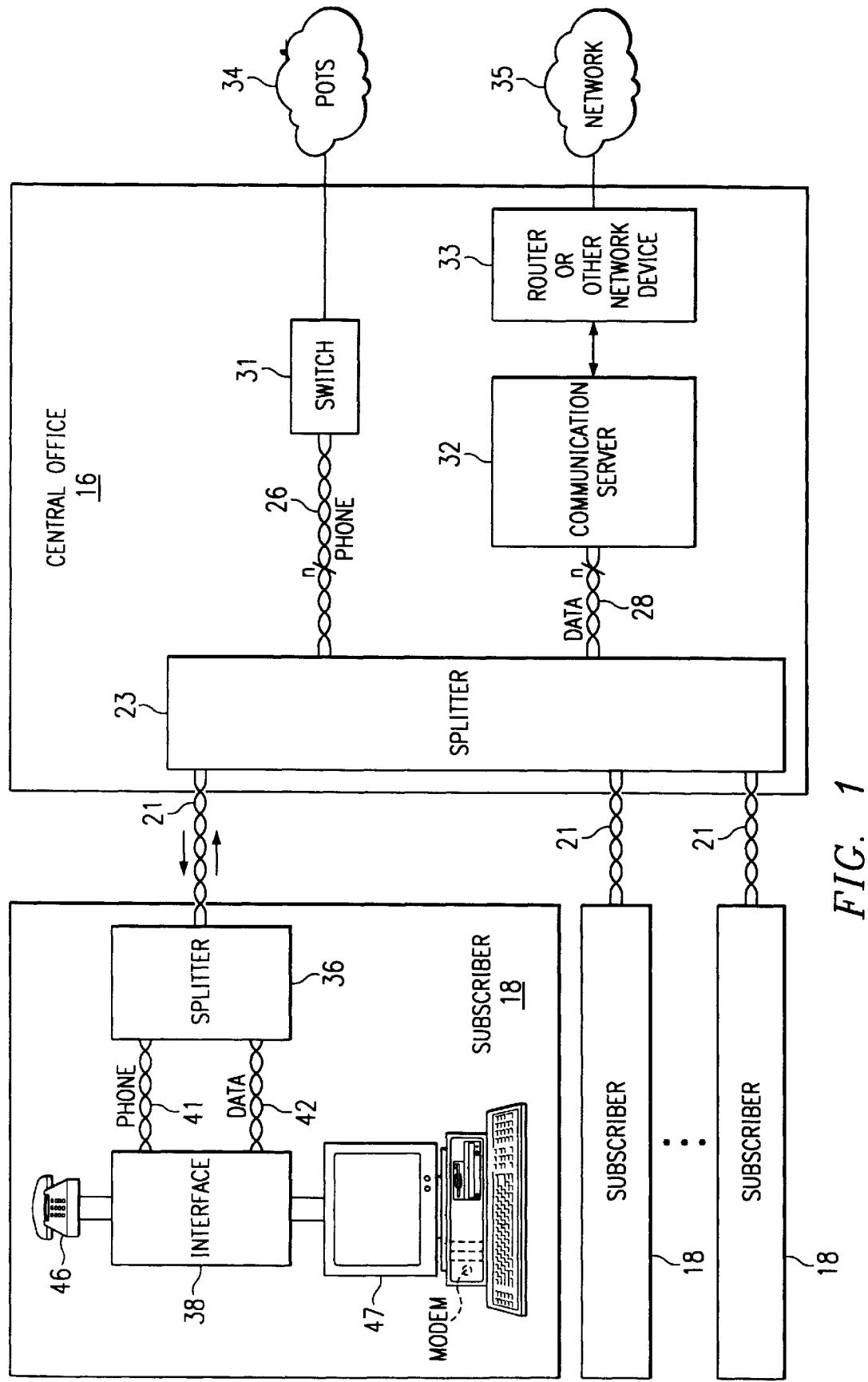
FIG. 1 is a block diagram of a communication system for providing telecommunications services.

FIG. 1 is a block diagram of a communication system 10. The communication system 10 includes a central office 16 to provide telecommunications services to a plurality of subscribers 18. For example, the subscribers 18 could be homes or businesses. A plurality of differential transmission line pairs 21 each couple the central office 16 to a respective subscriber 18 and each serve as a communications link.

The central office 16 includes a central office splitter 23. The central office splitter 23 is coupled to each of the differential transmission line pairs 21, a plurality of phone differential line pairs 26, and a plurality of data differential line pairs 28. The central office splitter 23 is more fully described later in association with FIG. 2. The phone differential line pairs 26 are coupled to a switch 31. The switch 31 is further coupled to a plain old telephone service (POTS) system 34. The data differential line pairs 28 are coupled to a communications server 32. The communication server 32 is further coupled to a router or other network device 33. The router or other network device 33 is further coupled to a network 35.

Each subscriber 18 includes a subscriber splitter 36. The subscriber splitter 36 is coupled to the central office splitter 23 by one of the differential transmission line pairs 21. The subscriber splitter 36 is more fully described later in association with FIG. 2. Each of the subscribers 18 further includes an interface 38 which is coupled to the subscriber splitter 36 by a twisted pair phone line 41 and a twisted pair data line 42. A phone 46 is coupled to the twisted pair phone line 41 by the interface 38. A modem in a computer 47 is coupled to the twisted pair data line 42 by the interface 38.

The communication system 10 provides phone and data telecommunications services to the subscribers 18 from the central office 16. The central office 16 maintains connections suitable for providing voice related services through the switch 31, and data related services through the router or other network device 33 and the communication server 32. The signals on the central office phone and data differential line pairs 26 and 28 are multiplexed by the central office splitter 23 to provide appropriate phone and data signals to each subscriber 18 over the differential transmission line pairs 21. The splitter 23 demultiplexes signals going in the opposite direction. The subscriber splitter 36 demultiplexes the phone and data signals from the differential transmission line pair 21 and provides them to the interface 38 on the twisted pair phone and data lines 41 and 42, and multiplexes signals going in the opposite direction. The interface 38 then provides the appropriate phone signals to the phone 46 and the appropriate data signals to the modem in the computer 47.

In this embodiment, the central office 16 and the subscribers 18 are widely separated by physical distance. The differential transmission line pairs 21 couple the physically diverse locations of the central office 16 and the subscriber 18 and may be, for example, telephone lines strung along telephone poles. Thus, the differential transmission line pairs 21 are vulnerable to being struck by lightning. Lightning strikes could potentially damage equipment in the communication system 10 which is coupled to the differential transmission line pair 21. Accordingly, protective circuitry is provided to help protect this equipment from damage, as described below in association with FIG. 2.

Bellcore Spec GR-1089-CORE is an industry standard which defines two levels of lightning strike, and how a system must respond to each. After a level one lightning strike the system must be capable of operating and must not be a safety hazard. After a level two strike, the Bellcore specification does not require that the system be able to continue functioning. The level one strike typically involves a lower voltage level than that caused by a level two strike. The differential transmission line pair 21 is vulnerable to lightning strikes of both levels of intensity. According to the invention, capability exceeding the industry standard is provided, in that protective circuitry allows the telecommunications equipment to continue functioning after a level two strike, albeit with some degradation of performance.

Figure 2:
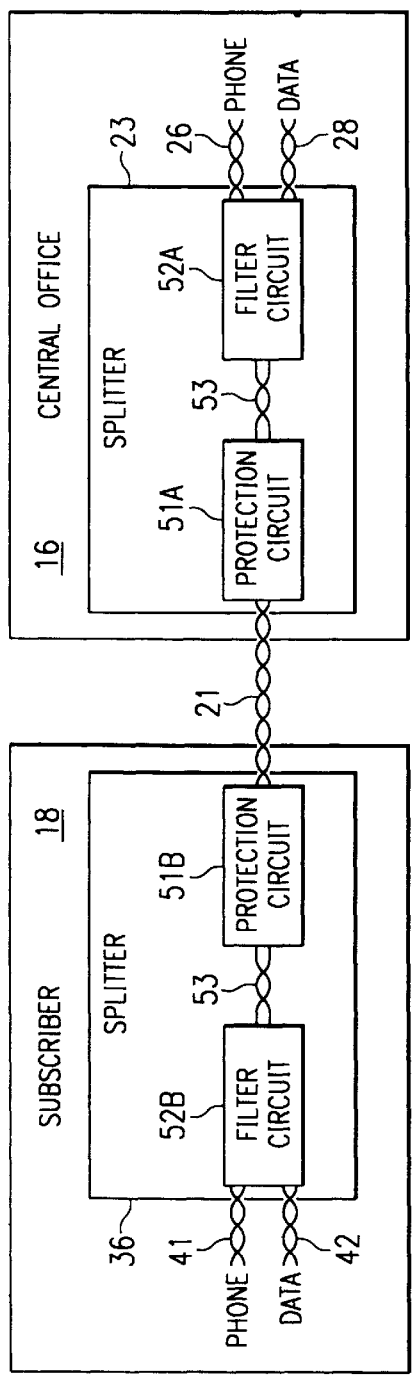
FIG. 2 is a block diagram showing a detailed view of relevant portions of a central office splitter and a subscriber splitter which are components of the system of FIG. 1.

FIG. 2 is a block diagram showing a detailed view of relevant portions of the central office splitter 23 and the subscriber splitter 36. The central office splitter 23 includes a protection circuit 51A and a filter circuit 52A. Reference numeral 51 will refer to the protection circuit in general, while reference numerals 51A, 51B, and so on, refer to specific instances of the protection circuit 51. Reference numeral 52 will refer to the filter circuit in general, while reference numerals 52A, 52B, and so on, refer to specific instances of the filter circuit. The protection circuit 51A is coupled to a first end of the differential transmission line pair 21. A splitter differential line pair 53 couples the protection circuit 51A, at terminals remote from the differential transmission line pair 21, to the filter circuit 52A. The filter circuit 52A is further coupled to one of the phone differential line pairs 26, at terminals remote from the differential transmission line pair 21. The filter circuit 52A is further coupled to one of the data differential line pairs 28, at terminals remote from both the differential transmission line pair 21 and the phone differential line pair 26.

The subscriber splitter 36 includes a protection circuit 51B and a filter circuit 52B. The protection circuit 51B is coupled to a second end of the differential transmission line pair 21 remote from the protection circuit 51A. The protection circuit 51B is further coupled to the filter circuit 52B by another splitter differential line pair 53, at terminals of protection circuit 51B remote from the differential transmission line pair 21. The filter circuit 52B is further coupled to the twisted pair phone line 41, at terminals remote from the differential transmission line pair 21. The filter circuit 52B is further coupled to the twisted pair data line 42, at terminals remote from both the twisted pair phone line 41 and the differential transmission line pair 21. The phone and data twisted line pairs 41 and 42 may be unshielded twisted pairs (UTP), shielded twisted pairs (STP), or some other suitable type or category of twisted pair wiring made of copper or other suitable material.

Figure 3:
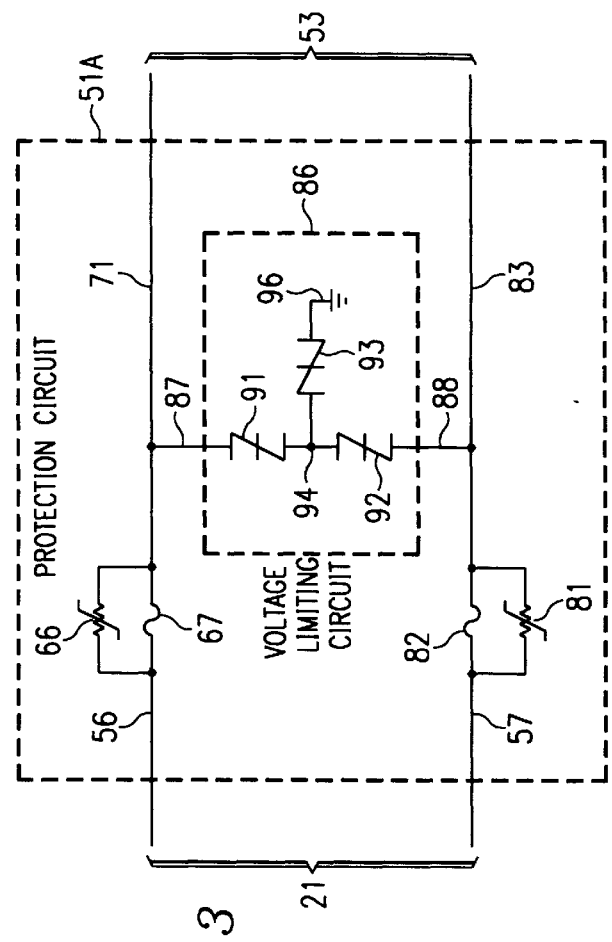
FIG. 3 is a schematic circuit diagram of a protection circuit which is a component of the central office splitter of FIG. 2.

FIG. 3 is a schematic circuit diagram of the protection circuit 51A. Protection circuit 51B is identical to protection circuit 51A in the disclosed embodiment, and therefore only protection circuit 51A is described in detail. The differential transmission line pair 21 includes a first transmission line 56 and a first supplemental line 57 coupled to the protection circuit 51A. The splitter differential line pair 53 includes a first splitter line 71 and a second splitter line 83. A first resettable fuse 66 and a first non-resettable fuse 67 are coupled in parallel with each other, and each have one end coupled to the first transmission line 56 and another end coupled to the first splitter line 71. A second resettable fuse 81 and a second non-resettable fuse 82 are coupled in parallel with each other, and each have one end coupled to the second transmission line 57 and another end coupled to the second splitter line 83.

In this embodiment, the resettable fuses 66 and 81 are each a solid state, positive temperature co-efficient, over current protection device which will automatically reset after being tripped. Also in this embodiment, the non-resettable fuses 67 and 82 are each a slow interrupt fuse. Suitable fuses of both types are commercially available. In the disclosed embodiment, resettable fuses 66 and 81 may be part number TR600-160 available from Raychem of Menlo Park, Calif., and non-resettable fuses 67 and 82 may be part number 23011.5 available from Littelfuse of Des Plaines, Ill.

A voltage limiting circuit 86 includes a first end 87 and a second end 88. The voltage limiting circuit 86 is coupled at the first end 87 to the first splitter line 71. The voltage limiting circuit 86 is further coupled at the second end 88 to the second splitter line 83.

The voltage limiting circuit 86 includes first, second, and third solid state transient voltage protector devices 91, 92, and 93. Devices 91, 92, and 93 are commercially available. In the disclosed embodiment, the circuit 86 may be a device available as part number P265P3203AC from Teccor of Irving, Tex. The first and second solid state transient voltage protector devices 91 and 92 are coupled in series with each other between the first end 87 and the second end 88 of the voltage limiting circuit 86. The third solid state transient voltage protector device 93 is coupled at one end to a node 94 located between the first and second solid state transient voltage protector devices 91 and 92, and is further coupled at an end remote from the node 94 to a reference potential 96.

The protection circuit 51A operates as follows. In this embodiment, the protection circuit protects telecommunications equipment from being damaged by a lightning strike of level one or level two intensity. The level two lightning strike may cause sufficient voltage to appear on the differential transmission line pair 21 to damage equipment coupled to the differential transmission line pair 21. The fuses 66, 67, 81, and 82 will each trip or interrupt in order to protect the equipment coupled through the protection circuit 51A to the differential transmission line pair 21 from the level two strike.

After being tripped, the first and second non-resettable fuses 67 and 82 will have to be manually replaced. In the meantime, the first and second resettable fuses 66 and 81 will automatically reset and allow the communications system 10 to operate after the level two lightning strike. The resettable fuses 66 and 81 allow for continued operation of the communications system 10 at a reduced level of performance until the non-resettable fuses 67 and 82 can be manually replaced. In normal use, the non-resettable fuses 67 and 82 may not be simply omitted in favor of the resettable fuses 66 and 81, due to certain non-linear operational characteristics of fuses 66 and 81 which result in degraded system performance.

The voltage limiting circuit 86 also operates to protect the equipment coupled to the differential transmission line pair 21 from a level one lightning strike. The level one strike is of lower intensity than the level two strike and does not result in sufficient voltage levels to trip any of the resettable or non-resettable fuses 66, 67, 81, and 82. The voltage limiting circuit uses the first, second and third solid state transient voltage protection devices 91, 92, and 93 to limit the excess current caused by the level one strike. The solid state transient voltage protection devices 91, 92, and 93 operate by maintaining a high impedance state until a predetermined voltage level is detected or exceeded. When the predetermined voltage level is detected or exceeded, the solid state transient voltage protection devices 91, 92, and 93 change from the high impedance state to a conductive state. The change allows the devices 91, 92, and 93 to protect other equipment from dangerously high current levels by limiting the peak voltage differential on the differential transmission line pair 21 and the splitter differential line pair 53, and thus the peak current.

The device 93 may optionally be omitted from voltage limiting circuit 86. If it is present, the reference potential 96 sinks excess current that the first, second, and third solid state transient voltage protection devices 91, 92, and 93 have diverted.

The present invention provides a number of technical advantages. One such technical advantage is the capability to survive level two lightning strikes while continuing to provide service at a reduced level, rather than no service at all. A further advantage is that system downtime is ameliorated by permitting some level of system operation during the delay associated with manual replacement of non-resettable fuses. Another advantage is that the invention provides this additional capability with minimal additional parts at minimal expense. Yet another advantage is that existing systems can be retrofit, and that minimal cost and time is needed to retrofit the protection circuit in an existing system.

Although one embodiment has been illustrated and described in detail, it should be understood that various changes, substitutions and alterations can be made therein without departing from the scope of the present invention. For example, although the disclosed invention uses a solid state, positive temperature co-efficient, over current protection device for each resettable fuse, any appropriate automatically resettable fuse could be used. For another example, the protection circuit could be used in any system requiring protection from lightning strikes and is not limited to telecommunication systems.

It should also be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. An apparatus, comprising:
 a communication link which includes a transmission line having first and second ends; and
 a protection circuit coupled to said first end of said transmission line, said protection circuit including first and second fuses which are coupled in parallel with each other, and which each have one end coupled to said first end of said transmission line, said first fuse being non-resettable and said second fuse being automatically resettable.

2. An apparatus according to claim 1, wherein said communication link is a telecommunications link.

3. An apparatus according to claim 1, wherein said resettable fuse is a solid-state, positive temperature coefficient, over current protection device.

4. An apparatus according to claim 1, wherein said non-resettable fuse is a slow interrupt fuse.

5. An apparatus according to claim 1, wherein said communication link includes a supplemental line having first and second ends, said transmission line and said supplemental line being a differential transmission line pair; and wherein said protection circuit further includes a third fuse and a fourth fuse which are coupled in parallel with each other, and which each have one end coupled to said first end of said supplemental line, said third fuse being non-resettable and said fourth fuse being automatically resettable.

6. An apparatus according to claim 5, wherein said protection circuit further includes a voltage limiting circuit coupled to a further end of each of said first and second fuses remote from said one end thereof, and coupled to a further end of each of said third and fourth fuses remote from said one end thereof.

7. An apparatus according to claim 5, including a further protection circuit coupled to said second end of said transmission line and said second end of said supplemental line, said further protection circuit including fifth and sixth fuses which are coupled in parallel with each other, and which each have one end coupled to said second end of said transmission line, said fifth fuse being non-resettable and said sixth fuse being automatically resettable, said further protection circuit also including seventh and eighth fuses which are coupled in parallel with each other, and which each have one end coupled to said second end of said supplemental line, said seventh fuse being non-resettable and said eighth fuse being automatically resettable.

8. An apparatus according to claim 7, including a first voltage limiting circuit coupled between a further end of said first fuse which is remote from said transmission line and a further end of said third fuse which is remote from said supplemental line, and including a second voltage limiting circuit coupled between a further end of said fifth fuse remote from said transmission line and a further end of said seventh fuse remote from said supplemental line.

9. An apparatus according to claim 8, wherein said first voltage limiting circuit includes first and second solid state transient voltage protector devices coupled in series with each other between said further ends of said first and third fuses, and wherein said second voltage limiting circuit includes third and fourth solid state transient voltage protector devices coupled in series with each other between said further ends of said fifth and seventh fuses.

10. An apparatus according to claim 9, wherein said first voltage limiting circuit includes a fifth solid state transient voltage protector device coupled between a reference potential and a node which is between said first and second solid state transient voltage protector devices, and wherein said second voltage limiting circuit includes a sixth solid state transient voltage protector device coupled between a reference potential and a node which is between said third and fourth solid state transient voltage protector devices.

11. A protection circuit, comprising:

first, second, third and fourth terminals;

first and second fuses which are coupled in parallel with each other, and which each have a first end coupled to said first terminal and a second end coupled to said third terminal, said first fuse being non-resettable and said second fuse being automatically resettable; and third and fourth fuses which are coupled in parallel with each other, and which each have a first end coupled to said second terminal and a second end coupled to said fourth terminal, said third fuse being non-resettable and said fourth fuse being automatically resettable.

12. A protection circuit according to claim 11, including a voltage limiting circuit coupled between said third terminal and said fourth terminal, said voltage limiting circuit including first and second solid state transient voltage protector devices coupled in series with each other between said third and fourth terminals, and a third solid state transient voltage protector device coupled between a reference potential and a node which is between said first and second solid state transient voltage protector devices; and wherein said first and third fuses are each a slow interrupt fuse, and said second and fourth fuses are each a solid-state, positive temperature coefficient, over current protection device.

13. A system comprising:

a plurality of differential transmission line pairs, each said differential transmission line pair including a transmission line and a supplemental line, said transmission line including a first end and a second end, and said supplemental line including a first end and a second end;

a plurality of subscriber splitters each coupled to a respective one of said differential transmission line pairs;

a central office splitter coupled to each of said differential transmission line pairs at ends thereof remote from said subscriber splitters; and said central office splitter including a plurality of protection circuits, each of said protection circuits including a first fuse, a second fuse, a third fuse, and a fourth fuse, said first fuse and said second fuse being coupled in parallel with each other and each having one end coupled to said first end of a respective one of said transmission lines, said third fuse and said fourth fuse being coupled in parallel with each other, and each having one end coupled to said first end of a respective one of said supplemental lines, each said first fuse being non-resettable, each said second fuse being automatically resettable, each said third fuse being non-resettable, and each said fourth fuse being automatically resettable.

14. A system according to claim 13, wherein each said resettable fuse is a solid-state, positive temperature coefficient, over current protection device and wherein each said non-resettable fuse is a slow interrupt fuse.

15. A system according to claim 13, wherein each of said subscriber splitters includes:

a protection circuit including a fifth fuse, a sixth fuse, a seventh fuse, and an eighth fuse; and said fifth fuse and said sixth fuse being coupled in parallel with each other, and each having one end coupled to said second end of a respective one of said transmission lines, said seventh fuse and said eighth fuse being coupled in parallel with each other, and each having one end coupled to said second end of a respective one of said supplemental lines, said fifth fuse being non-resettable, said sixth fuse being automatically resettable, said seventh fuse being non-resettable, and said eighth fuse being automatically resettable.

16. A system according to claim 15, wherein said central office splitter further includes a plurality of first filter circuits, each of said first filter circuits being coupled to a further end of a respective one of said first fuses remote from said one end thereof, and being coupled to a further end of a respective one of said third fuses remote from said one end thereof; and wherein each of said subscriber splitters further includes a second filter circuit, each said second filter circuit being coupled to a further end of said fifth fuse of the subscriber circuit remote from said one end thereof and being coupled to a further end of said seventh fuse of the subscriber circuit remote from said one end thereof.

17. A system according to claim 15, wherein said central office splitter further includes a plurality of first voltage limiting circuits, each of said first voltage limiting circuits having a first end and a second end, each of said first voltage limiting circuits being coupled at said first end to a further end of a respective one of said first fuses which is remote from said transmission line, and being coupled at said second end to a further end of a respective one of said third fuses which is remote from said supplemental line; and wherein each said subscriber splitter further includes a second voltage limiting circuit, said second voltage limiting circuit of each said subscriber splitter having a first end and a second end, said second voltage limiting circuit being coupled at said first end to a further end of said fifth fuse of the subscriber circuit remote from said supplemental line, and said second voltage limiting circuit being coupled at said second end to a further end of said seventh fuse of the subscriber circuit remote from said supplemental line.

18. A system according to claim 17, wherein each of said voltage limiting circuits includes first and second solid state transient voltage protector devices coupled in series with each other between said first and second ends thereof.

19. A system according to claim 18, wherein each of said voltage limiting circuits includes a third solid state transient voltage protector device coupled between a reference potential and a node which is between said first and second solid state transient voltage protector devices thereof.

20. A protection circuit, comprising:

first, second, third and fourth terminals;

first means having first and second operational modes in which a current flow therethrough is respectively permitted and prevented, wherein during said first operational mode thereof said first means is responsive to the current flow therethrough exceeding a first threshold for switching said first means from said first operational mode thereof to said second operational mode thereof, said first means being incapable of automatically switching from said second operational mode thereof back to said first operational mode thereof;

second means having first and second operational modes in which a current flow therethrough is respectively permitted and prevented, wherein during said first operational mode thereof said second means is responsive to the current flow therethrough exceeding a second threshold for switching said second means from said first operational mode thereof to said second operational mode thereof, and for thereafter automatically switching said second means from said second operational mode thereof back to said first operational mode thereof, said first and second means being coupled in parallel with each other, and each having a first end coupled to said first terminal and a second end coupled to said third terminal;

third means having first and second operational modes in which a current flow therethrough is respectively permitted and prevented, wherein during said first operational mode thereof said third means is responsive to the current flow therethrough exceeding a third threshold for switching said third means from said first operational mode thereof to said second operational mode thereof, said third means being incapable of automatically switching from said second operational mode thereof back to said first operational mode thereof; and fourth means having first and second operational modes in which a current flow therethrough is respectively permitted and prevented, wherein during said first operational mode thereof said fourth means is responsive to the current flow therethrough exceeding a fourth threshold for switching said fourth means from said first operational mode thereof to said second operational mode thereof, and for thereafter automatically switching said fourth means from said second operational mode thereof back to said first operational mode thereof, said third and fourth means being coupled in parallel with each other, and each having a first end coupled to said second terminal and a second end coupled to said fourth terminal.

21. A protection circuit according to claim 20, including voltage limiting means coupled between said third terminal and said fourth terminal for limiting a voltage differential between said third and fourth terminals.

22. A protection circuit according to claim 21, wherein said voltage limiting means includes first and second solid state transient voltage protector devices coupled in series with each other between said third and fourth terminals, and includes a third solid state transient voltage protector device coupled between a reference potential and a node which is between said first and second solid state transient voltage protector devices; and wherein said first and third means each include a slow interrupt fuse, and said second and fourth means each include a solid-state, positive temperature coefficient, over current protection device.

23. A protection circuit, comprising:

first, second, third and fourth terminals;

first means coupled between said first and third terminals, and having a first operational mode in which said first means permits a current flow therethrough between said first and third terminals substantially free of resistance, a second operational mode in which said first means inhibits substantially all current flow therethrough between said first and third terminals, and a third operational mode in which said first means permits a current flow therethrough between said first and third terminals subject to a resistance, wherein during said first operational mode thereof said first means is responsive to the current flow therethrough exceeding a first threshold for switching said first means from said first operational mode thereof to said second operational mode thereof, and for thereafter automatically switching said first means from said second operational mode thereof to said third operational mode thereof;

second means coupled between said second and fourth terminals, and having a first operational mode in which said second means permits a current flow therethrough between said second and fourth terminals substantially free of resistance, a second operational mode in which said second means inhibits substantially all current flow therethrough between said second and fourth terminals, and a third operational mode in which said second means permits a current flow therethrough between said second and fourth terminals through a resistance, wherein during said first operational mode thereof said second means is responsive to the current flow therethrough exceeding a second threshold for switching said second means from said first operational mode thereof to said second operational mode thereof, and for thereafter automatically switching said second means from said second operational mode thereof to said third operational mode thereof; and voltage limiting means coupled between said third terminal and said fourth terminal for limiting a voltage differential between said third and fourth terminals.

24. A protection circuit according to claim 23, wherein said voltage limiting means includes first and second solid state transient voltage protector devices coupled in series with each other between said third and fourth terminals, and a third solid state transient voltage protector device coupled between a reference potential and a node which is between said first and second solid state transient voltage protector devices; wherein said first and third means each include a slow interrupt fuse; and wherein said second and fourth means each include a solid-state, positive temperature coefficient, over current protection device.

* * * * *